(12) United States Patent
Umayahara et al.

(10) Patent No.: US 8,802,310 B2
(45) Date of Patent: Aug. 12, 2014

(54) FUEL CELL SYSTEM

(75) Inventors: Kenji Umayahara, Nishikamo-gun (JP); Tadaichi Matsumoto, Okazaki (JP); Fusaki Igarashi, Toyota (JP); Michio Yoshida, Nishikamo-gun (JP); Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/472,088

(22) Filed: May 15, 2012

(65) Prior Publication Data

US 2012/0225330 A1 Sep. 6, 2012

Related U.S. Application Data

(62) Division of application No. 12/522,584, filed as application No. PCT/JP2008/051997 on Jan. 31, 2008.

(30) Foreign Application Priority Data

Feb. 5, 2007 (JP) .................................. 2007-026092

(51) Int. Cl.
*H01M 8/04* (2006.01)
*B60L 7/16* (2006.01)
*B60L 11/18* (2006.01)

(52) U.S. Cl.
CPC ............ *H01M 8/04559* (2013.01); *Y02T 90/34* (2013.01); *H01M 8/04679* (2013.01); *B60L 7/16* (2013.01); *H01M 8/04589* (2013.01); *B60L 11/1892* (2013.01); *H01M 8/04626* (2013.01); *H01M 8/04089* (2013.01); *H01M 8/0488* (2013.01); *H01M 8/04761* (2013.01); *Y02E 60/50* (2013.01); *H01M 8/04619* (2013.01); *B60L 11/1887* (2013.01); *H01M 8/04753* (2013.01)
USPC .......................................................... 429/430

(58) Field of Classification Search
USPC .................................................. 429/428–432
See application file for complete search history.

(56) References Cited

U.S. PATENT DOCUMENTS 8,084,151 B2 12/2011 Umayahara
2002/0102447 A1 8/2002 Kato
(Continued)

FOREIGN PATENT DOCUMENTS

DE         10202875 A1   8/2002
DE    102005042772 A1   8/2006
(Continued)

OTHER PUBLICATIONS

International Search Report mailed May 1, 2008 of PCT/JP2008/051997.

(Continued)

*Primary Examiner* — Patrick Ryan
*Assistant Examiner* — Wyatt McConnell
(74) *Attorney, Agent, or Firm* — Kenyon & Kenyon LLP

(57) ABSTRACT

When a request power for a fuel cell is smaller than a predetermined value, a fuel cell system stops the supply of an oxidizing gas to the fuel cell and lowers the output voltage of the fuel cell from a use upper limit voltage to a reduction voltage to perform catalyst activation processing. When the output voltage of the fuel cell lowers to an air blow voltage because of the shortage of the oxidizing gas, the fuel cell system resupplies the oxidizing gas to recover the output voltage of the fuel cell.

1 Claim, 16 Drawing Sheets

(56) References Cited

U.S. PATENT DOCUMENTS

| | | | | |
|---|---|---|---|---|
| 2004/0017175 | A1* | 1/2004 | Lee et al. | 320/104 |
| 2004/0219399 | A1* | 11/2004 | Zhu et al. | 429/13 |
| 2006/0097575 | A1* | 5/2006 | Xu et al. | 307/9.1 |
| 2006/0188765 | A1* | 8/2006 | Matsuzaki et al. | 429/23 |
| 2007/0166582 | A1 | 7/2007 | Okamoto | |

FOREIGN PATENT DOCUMENTS

| | | |
|---|---|---|
| JP | 2002-141092 A | 5/2002 |
| JP | 2002-231286 A | 8/2002 |
| JP | 2004-172028 A | 6/2004 |
| JP | 2005-257340 A | 9/2005 |
| JP | 2005-310623 A | 11/2005 |
| JP | 2005-346979 A | 12/2005 |
| JP | 2006-236739 A | 9/2006 |
| JP | 2006-294255 A | 10/2006 |
| JP | 2006-294447 A | 10/2006 |
| JP | 2007-1798 A | 1/2007 |

OTHER PUBLICATIONS

Advisory Action issued on Oct. 22, 2012 in parent U.S. Appl. No. 12/522,584.

Espacenet, English-language abstract of US2006188765, corresponding to DE102005042772A1.

Espacenet, English-language abstract of US2002102447A1, corresponding to DE10202875A1.

Examiner's Answer to Appeal Brief issued on Apr. 15, 2013 in parent U.S. Appl. No. 12/522,584.

Notice of Panel Decision from Pre-Appeal Brief Request for Review issued on Dec. 10, 2012 in parent U.S. Appl. No. 12/522,584.

* cited by examiner

FIG.4

EXECUTING CONDITIONS OF
CATALYST ACTIVATION PROCESSING

| VEHICLE STATE | RUNNING | | | | STOPPED | |
|---|---|---|---|---|---|---|
| RUNNING STATE | POWER | | REGENERATION | | | |
| OPERATION MODE | 1 | 2 | 1 | 2 | 1 | 2 |
| CATALYST ACTIVATION PROCESSING | OFF | OFF | OFF | OFF | ON | OFF |

FIG. 6

EXECUTING CONDITIONS OF
CATALYST ACTIVATION PROCESSING

|  | ALLOW | PROHIBIT |
|---|---|---|
| RUNNING STATE | VEHICLE SPEED $\leq$ VC1 | VEHICLE SPEED $\geq$ VC2 |
| OPERATION MODE | FIRST OPERATION MODE | EXCEPT FIRST OPERATION MODE |
| BATTERY CHARGING CAPABILITY | Win $\leq$ W1 | Win $\geq$ W2 |
| GAS LEAKAGE DETECTION | GAS LEAKAGE IS NOT DETECTED | GAS LEAKAGE IS DETECTED |
| AIR COMPRESSOR | STOPPED | OPERATING |

FUEL CELL SYSTEM

This is a division of application Ser. No. 12/522,584 filed 9 Jul. 2009, which is a 371 national phase application of PCT/JP2008/051997 filed 31 Jan. 2008, which claims priority to Japanese Patent Application No. 2007-026092 filed 5 Feb. 2007, the contents of which are incorporated herein by reference.

TECHNICAL FIELD

The present invention relates to a fuel cell system having a catalyst activating function.

BACKGROUND ART

A fuel cell stack is a power generation system which oxidizes a fuel by an electrochemical process to directly convert energy released by an oxidizing reaction into electric energy. The fuel cell stack has a membrane-electrode assembly in which both side surfaces of a polymer electrolytic film for selectively transporting hydrogen ions are sandwiched by a pair of electrodes formed of a porous material. Each of the pair of electrodes has a catalyst layer which contains, as a main component, carbon powder carrying a platinum-based metal catalyst and which comes in contact with the polymer electrolytic film, and a gas diffusion layer formed on the surface of the catalyst layer and having both air permeability and electron conductivity.

In this type of fuel cell system, when a cell operation is continued in an operation region where a cell voltage is an oxidization potential (about 0.7 V to 1.0 V), hydroxides are adsorbed on the surface of the platinum catalyst of the catalyst layer, whereby an activation overvoltage increases, and hence output characteristics lower sometimes. In view of such a situation, Japanese Patent Application Laid-Open No. 2005-346979 describes processing of stopping the supply of air to the fuel cell stack and forcibly lowering the output voltage of the fuel cell stack by a DC/DC converter to lower the cell voltage to a reduction potential (e.g., 0.6 V or less), thereby removing the hydroxides from the surface of the platinum catalyst to recover a catalyst activity. It is also described in the document that a surplus power generated by the catalyst activation processing is charged into a battery for auxiliary machines.

[Patent Document 1] Japanese Patent Application Laid-Open No. 2005-346979

DISCLOSURE OF THE INVENTION

However, in a fuel cell vehicle in which a fuel cell system is used as a car-mounted power source, when the output voltage of a fuel cell stack is forcibly lowered during power running to perform catalyst activation processing, a cell voltage temporarily lowers. Therefore, an output following an accelerator response during a request for a high load cannot be obtained sometimes, and drivability (a maneuvering performance) remarkably lowers sometimes.

Moreover, in a case where the output voltage of the fuel cell stack is forcibly lowered to perform the catalyst activation processing while the supply of a reactant gas to the fuel cell stack is continued, an excessive surplus power that cannot completely be charged into an accumulator device is generated during the catalyst activation processing sometimes. To suppress the damage of the accumulator device due to overcharge, the surplus power generated during the catalyst activation processing is preferably as small as possible.

To solve the problem, an object of the present invention is to suggest a fuel cell system capable of performing the catalyst activation processing of a fuel cell so that drivability is not impaired and so that a surplus power generated during the catalyst activation processing is minimized.

To achieve the above object, a fuel cell system according to the present invention comprises: a fuel cell which receives a supplied fuel gas and oxidizing gas to generate a power; and a control device which stops the supply of the oxidizing gas to the fuel cell and lowers the output voltage of the fuel cell to perform catalyst activation processing, when a request power for the fuel cell is smaller than a predetermined value.

When the request power for the fuel cell is smaller than a threshold value, the supply of the oxidizing gas to the fuel cell is stopped to perform the catalyst activation processing, so that drivability is not impaired and so that a surplus power generated during the catalyst activation processing can be minimized.

The fuel cell system according to the present invention further comprises: an accumulator device, and the control device prohibits the catalyst activation processing, when the power chargeable into the accumulator device is a predetermined value or less.

When the surplus power generated by the catalyst activation processing cannot be charged into the accumulator device, the catalyst activation processing can be prohibited to avoid the damage of the accumulator device.

In the fuel cell system according to the present invention, the control device prohibits the catalyst activation processing, when the running speed of a vehicle using the fuel cell system as a car-mounted power source is a predetermined value or more.

When the vehicle has a running state, the catalyst activation processing can be prohibited to suppress the deterioration of the drivability caused by the lowering of the cell voltage.

The fuel cell system according to the present invention further comprises: a plurality of block valves arranged in a piping system which supplies the fuel gas to the fuel cell. The control device closes the plurality of block valves to form a closed space in the piping system, and detects a gas pressure fluctuation in the closed space to prohibit the catalyst activation processing while gas leakage is detected.

The catalyst activation processing during the detection of the gas leakage can be prohibited to avoid the deterioration of the precision of the gas leakage detection.

In the fuel cell system according to the present invention, the control device performs the catalyst activation processing, when the output performance of the fuel cell lowers.

The catalyst activation processing is performed when the catalyst activation processing is necessary. In consequence, the number of the performing times of the catalyst activation processing can be minimized, and it is possible to avoid the deterioration of the durability of the fuel cell due to the repeated performing of the catalyst activation processing.

The fuel cell system according to the present invention further comprises a DC/DC converter which controls the output voltage of the fuel cell, and a capacitor into which the power generated by the fuel cell is charged. When the request power for the fuel cell is smaller than the predetermined value, the control device connects an output terminal of the fuel cell to the DC/DC converter, and controls the output voltage of the fuel cell by the DC/DC converter, whereas when the request power for the fuel cell is the predetermined value or more, the control device connects the output terminal of the fuel cell to the capacitor to charge the power generated by the fuel cell into the capacitor.

BRIEF DESCRIPTION OF THE DRAWINGS

FIG. 4 is an explanatory view showing the outline of the executing conditions of catalyst activation processing;

FIG. 6 is an explanatory view showing the details of the executing conditions of the catalyst activation processing;

BEST MODE FOR CARRYING OUT THE INVENTION

Figure 1:
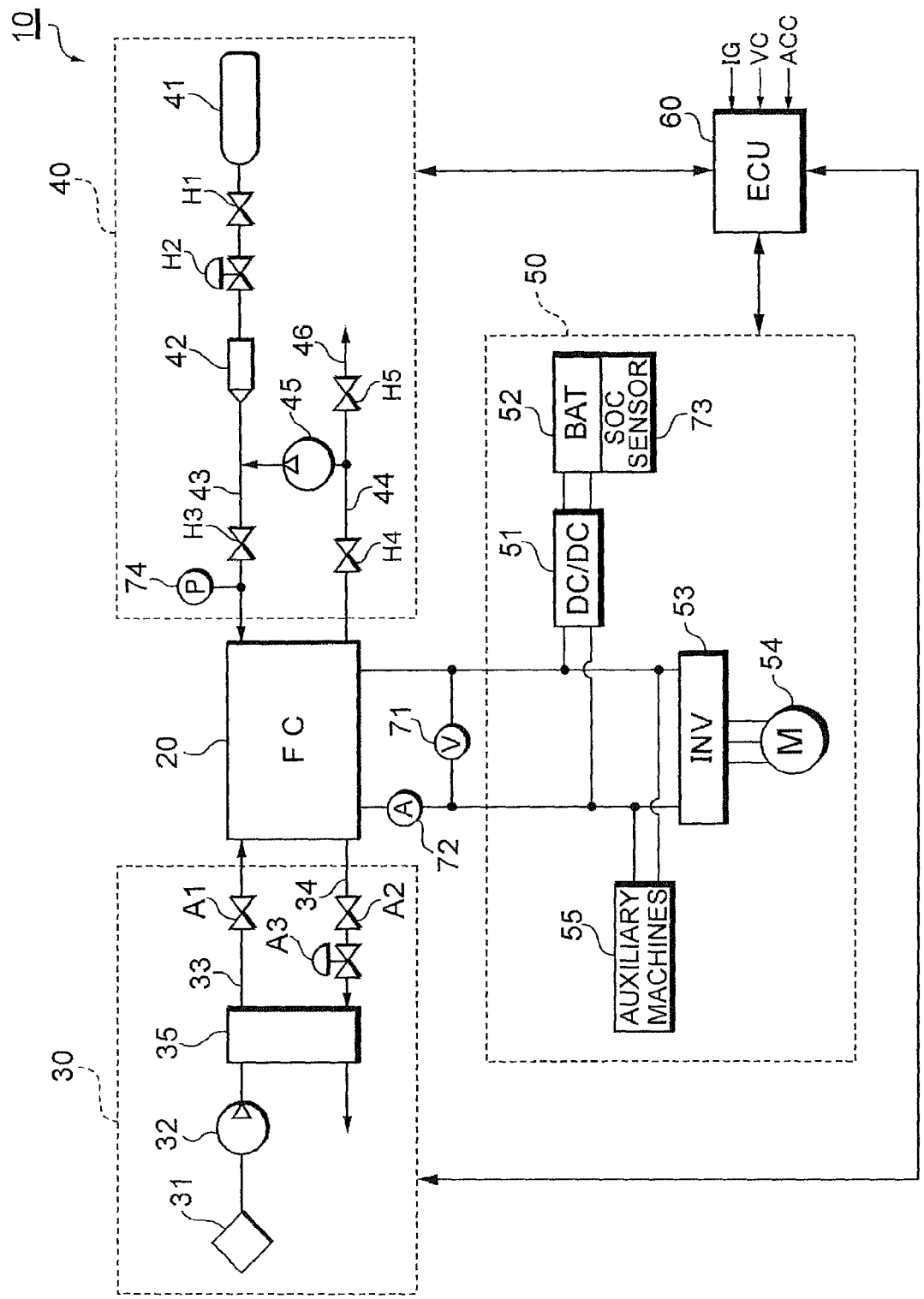
FIG. 1 is a system constitution diagram of a fuel cell system according to Embodiment 1.

Hereinafter, an embodiment according to the present invention will be described with reference to the drawings. The same device is denoted with the same reference numeral, and redundant description is omitted.

Embodiment 1

FIG. 1 shows a system constitution of a fuel cell system 10 according to Embodiment 1.

The fuel cell system 10 functions as a car-mounted power source system mounted on a fuel cell vehicle, and includes a fuel cell stack 20 which receives a supplied reactant gas (a fuel gas, an oxidizing gas) to generate a power; an oxidizing gas supply system 30 for supplying air as the oxidizing gas to the fuel cell stack 20; a fuel gas supply system 40 for supplying a hydrogen gas as the fuel gas to the fuel cell stack 20; a power system 50 for controlling charging/discharging of the power; and a controller 60 which generally controls the whole system.

The fuel cell stack 20 is a solid polymer electrolyte type cell stack in which a large number of cells are stacked in series. In the fuel cell stack 20, an oxidizing reaction of formula (1) occurs in an anode pole, and a reducing reaction of formula (2) occurs in a cathode pole. In the whole fuel cell stack 20, an electromotive reaction of formula (3) occurs.

$$H_2 \rightarrow 2H^+ + 2e^- \tag{1}$$

$$(1/2)O_2 + 2H^+ + 2e^- \rightarrow H_2O \tag{2}$$

$$H_2 + (1/2)O_2 \rightarrow H_2O \tag{3}$$

To the fuel cell stack 20 are attached a voltage sensor 71 for detecting an output voltage (an FC voltage) of the fuel cell stack 20 and a current sensor 72 for detecting an output current (an FC current).

The oxidizing gas supply system 30 has an oxidizing gas passage 33 through which the oxidizing gas to be supplied to the cathode pole of the fuel cell stack 20 flows, and an oxidizing off gas passage 34 through which an oxidizing off gas discharged from the fuel cell stack 20 flows. The oxidizing gas passage 33 is provided with an air compressor 32 which takes the oxidizing gas from the atmosphere through a filter 31, a humidifier 35 which humidifies the oxidizing gas to be pressurized by the air compressor 32, and a block valve A1 which blocks the supply of the oxidizing gas to the fuel cell stack 20. The oxidizing off gas passage 34 is provided with a block valve A2 which blocks the discharge of the oxidizing off gas from the fuel cell stack 20, a back pressure regulation valve A3 which regulates an oxidizing gas supply pressure, and the humidifier 15 which performs water content exchange between the oxidizing gas (a dry gas) and the oxidizing off gas (a wet gas).

The fuel gas supply system 40 has a fuel gas supply source 41; a fuel gas passage 43 through which the fuel gas to be supplied from the fuel gas supply source 41 to the anode pole of the fuel cell stack 20 flows; a circulation passage 44 for returning, to the fuel gas passage 43, a fuel off gas discharged from the fuel cell stack 20; a circulation pump 45 which feeds, to the fuel gas passage 43, the fuel off gas under pressure in the circulation passage 44; and a gas/water discharge passage 46 branched from and connected to the circulation passage 44.

The fuel gas supply source 41 is constituted of, for example, a high-pressure hydrogen tank, a hydrogen occluded alloy or the like, and receives the hydrogen gas having a high pressure (e.g., 35 MPa to 70 MPa). When a block valve H1 is opened, the fuel gas flows from the fuel gas supply source 41 to the fuel gas passage 43. The pressure of the fuel gas is decreased to, for example, about 200 kPa by a regulator H2 and an injector 42, to supply the gas to the fuel cell stack 20.

It is to be noted that the fuel gas supply source 41 may be constituted of a reformer which forms a hydrogen-rich reformed gas from a hydrocarbon-based fuel, and a high-pressure gas tank which brings the reformed gas formed by this reformer into a high-pressure state to accumulate the pressure.

The fuel gas passage 43 is provided with the block valve H1 for blocking or allowing the supply of the fuel gas from the fuel gas supply source 41, the regulator H2 which regulates the pressure of the fuel gas, the injector 42 which controls the amount of the fuel gas to be supplied to the fuel cell stack 20, a block valve H3 for blocking the supply of the fuel gas to the fuel cell stack 20, and a pressure sensor 74.

The regulator H2 is a device which regulates the upstream pressure (the primary pressure) of the regulator into a preset secondary pressure, and is constituted of, for example, a mechanical pressure reduction valve or the like which decreases the primary pressure. The mechanical pressure reduction valve has a housing provided with a back pressure chamber and a pressure adjustment chamber formed via a diaphragm, and has a constitution in which the primary pressure is decreased to a predetermined pressure by the back pressure of the back pressure chamber to form the secondary pressure in the pressure adjustment chamber. The regulator H2 can be arranged on the upstream side of the injector 42 to effectively decrease the upstream pressure of the injector 42. Therefore, the degree of freedom in the design of the mechanism structure (a valve body, the housing, a passage, a driving device, etc.) of the injector 42. Moreover, since the upstream pressure of the injector 42 can be decreased, it is possible to suppress a disadvantage that the valve body of the injector 42 does not easily move owing to the increase of a pressure difference between the upstream pressure and the downstream pressure of the injector 42. Therefore, the variable pressure adjustment range of the downstream pressure of the injector 42 can be increased, and the deterioration of the response of the injector 42 can be suppressed.

The injector 42 is an electromagnetic driving type opening/closing valve in which the valve body is directly driven with an electromagnetic driving force for a predetermined driving period and detached from a valve seat, whereby a gas flow rate or a gas pressure can be regulated. The injector 42 includes a valve seat having jet holes which jet a gas fuel such as the fuel gas, and also includes a nozzle body which supplies and guides the gas fuel to the jet holes, and the valve body movably received and held in an axial direction (a gas flow direction) with respect to this nozzle body to open or close the jet holes.

In the present embodiment, the valve body of the injector 42 is driven by a solenoid as an electromagnetic driving device, and a pulse-like excitation current supplied to this solenoid can be turned on/off to switch the open area of each jet hole in two stages. The gas jet time and the gas jet timing of the injector 42 are controlled by a control signal output from the controller 60, to precisely control the flow rate and the pressure of the fuel gas. The injector 42 directly drives and opens/closes the valve (the valve body and the valve seat) with the electromagnetic driving force, the driving period can be controlled to a high response region, and hence the injector has a high response. To supply the gas to the downstream side of the injector with a demanded flow rate, the injector 42 changes at least one of the open area (the open degree) and the opening time of the valve body provided in the gas passage of the injector 42, to regulate the flow rate (or a hydrogen molar concentration) of the gas to be supplied to the downstream side.

The circulation passage 44 is connected to a block valve H4 for blocking the discharge of the fuel off gas from the fuel cell stack 20, and the gas/water discharge passage 46 branched from the circulation passage 44. The gas/water discharge passage 46 is provided with a gas/water discharge valve H5. The gas/water discharge valve H5 operates in accordance with a command from the controller 60, to discharge, to the outside, the fuel off gas including impurities in the circulation passage 44 and the water content. When the gas/water discharge valve H5 opens, the concentration of the impurities in the fuel off gas in the circulation passage 44 decreases, and the concentration of hydrogen in the fuel off gas circulated through a circulation system can be increased.

The fuel off gas discharged through the gas/water discharge valve H5 is mixed with the oxidizing off gas flowing through the oxidizing off gas passage 34, and diluted by a diluter (not shown). The circulation pump 45 is driven by a motor to circulate and supply the fuel off gas of the circulation system to the fuel cell stack 20.

The power system 50 includes a DC/DC converter 51, a battery 52, a traction inverter 53, a traction motor 54 and auxiliary machines 55. The DC/DC converter 51 has a function of raising a direct-current voltage supplied from the battery 52 to output the voltage to the traction inverter 53 and a function of lowering a direct-current power generated by the fuel cell stack 20 or a regenerative power collected by the traction motor 54 by regenerative braking to charge the battery 52. The charging/discharging of the battery 52 is controlled by these functions of the DC/DC converter 51. Moreover, an operation point (the output voltage, an output current) of the fuel cell stack 20 is controlled by the voltage conversion control of the DC/DC converter 51.

The battery 52 functions as a storage source of a surplus power, a regenerative energy storage source during the regenerative braking, or an energy buffer during load fluctuation accompanying the acceleration or deceleration of the fuel cell vehicle. As the battery 52, for example, a nickel/cadmium accumulator battery, a nickel/hydrogen accumulator battery, or a secondary battery such as a lithium secondary battery is preferable. To the battery 52 is attached to an SOC sensor for detecting a state of charge (SOC).

The traction inverter 53 is, for example, a PWM inverter driven by a pulse width modulation system, and converts the direct-current voltage output from the fuel cell stack 20 or the battery 52 into a three-phase alternate-current voltage in accordance with a control instruction from the controller 60 to control the rotary torque of the traction motor 54. The traction motor 54 is, for example, a three-phase alternate-current motor, and constitutes a power source of the fuel cell vehicle.

The auxiliary machines 55 generically include motors arranged in units of the fuel cell system 10 (e.g., power sources for pumps, etc.), inverters for driving these motors, and various types of car-mounted auxiliary machine (e.g., an air compressor, an injector, a cooling water circulation pump, a radiator and the like).

The controller 60 is a computer system including a CPU, an ROM, an RAM and an input/output interface, and controls the units of the fuel cell system 10. For example, on receiving a startup signal IG output from an ignition switch, the controller 60 starts the operation of the fuel cell system 10 to obtain a request power of the whole system based on an accelerator open degree signal ACC output from an accelerator sensor, a vehicle speed signal VC output from a vehicle speed sensor and the like. The request power of the whole system is a total value of a vehicle running power and an auxiliary machine power.

Here, the auxiliary machine power includes a power consumed by a car-mounted auxiliary machine (the humidifier, the air compressor, the hydrogen pump, the cooling water circulation pump or the like), a power consumed by a device (a change gear, a wheel control device, a steering device, a suspension device or the like) necessary for the running of a vehicle, a power consumed by a device arranged in a passenger space (an air conditioner, a light fixture, an audio or the like) and the like.

Moreover, the controller 60 determines THE distribution of the output powers of the fuel cell stack 20 and the battery 52, controls the oxidizing gas supply system 30 and the fuel gas supply system 40 so that the amount of the power to be generated by the fuel cell stack 20 coincides with a target power. Furthermore, the controller controls the DC/DC converter 51 to regulate the output voltage of the fuel cell stack 20, thereby controlling the operation point (the output voltage, the output current) of the fuel cell stack 20. Furthermore, to obtain the target torque corresponding to an accelerator open degree, the controller 60 outputs, for example, U-phase, V-phase and W-phase alternate-current voltage instruction values as switching instructions to the traction inverter 53, and controls an output torque and the rotation number of the traction motor 54.

Figure 2:
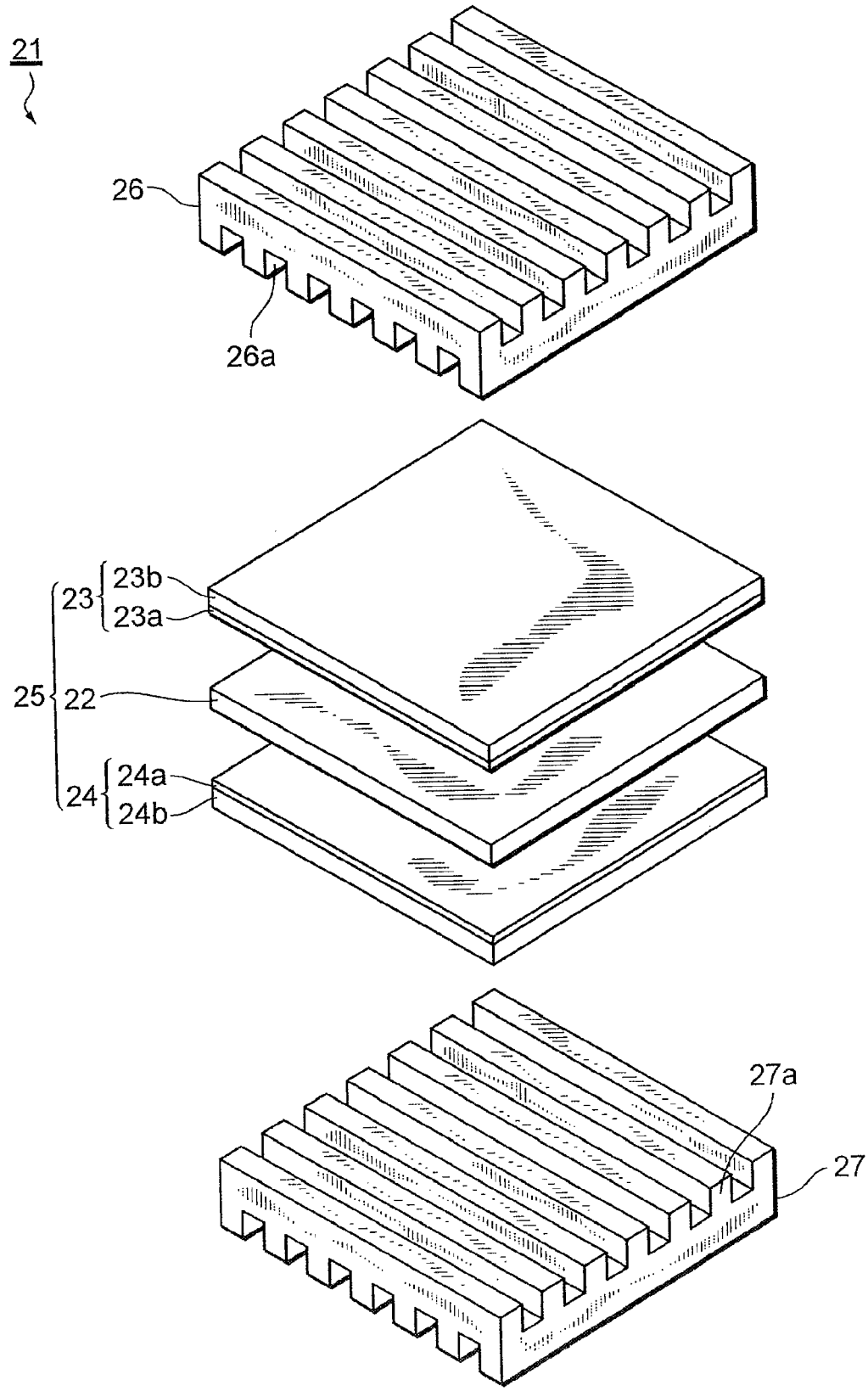
FIG. 2 is an exploded perspective view of a cell constituting a fuel cell stack.

FIG. 2 is an exploded perspective view of a cell 21 constituting the fuel cell stack 20.

The cell 21 is constituted of a polymer electrolytic film 22, an anode pole 23, a cathode pole 24, and separators 26, 27. The anode pole 23 and the cathode pole 24 are diffusion electrodes which sandwich the polymer electrolytic film 22 from both sides to constitute a sandwich structure. The separators 26, 27 constituted of air-impermeable conductive members further sandwich this sandwich structure from both sides, while forming the passages of the fuel gas and the oxidizing gas between the anode pole 23 and the cathode pole 24. The separator 26 is provided with ribs 26a having recessed sections. The anode pole 23 abuts on the ribs 26a to close openings of the ribs 26a, thereby forming a fuel gas passage. The separator 27 is provided with ribs 27a having recessed sections. The cathode pole 24 abuts on the ribs 27a to close openings of the ribs 27a, thereby forming an oxidizing gas passage.

The anode pole 23 has a catalyst layer 23a including carbon powder carrying a platinum-based metal catalyst (Pt, Pt—Fe, Pt—Cr, Pt—Ni, Pt—Ru or the like) as a main component, the catalyst layer coming in contact with the polymer electrolytic film 22; and a gas diffusion layer 23b formed on the surface of the catalyst layer 23a and having both air permeability and electron conductivity. Similarly, the cathode pole 24 has a catalyst layer 24a and a gas diffusion layer 24b. More specifically, as to the catalyst layers 23a, 24a, the carbon powder carrying platinum or an alloy made of platinum and another metal is dispersed in an appropriate organic solvent, and an electrolytic solution is added as much as an appropriate amount, pasted and screen-printed on the polymer electrolytic film 22. The gas diffusion layers 23b, 24b are formed of carbon cloth woven with a thread made of a carbon fiber, carbon paper or carbon felt. The polymer electrolytic film 22 is a proton conductive ion exchange membrane formed of a solid polymer material, for example, a fluorine-based resin, and exerts satisfactory electric conductivity in a wet state. The polymer electrolytic film 22, the anode pole 23 and the cathode pole 24 form a membrane-electrode assembly 25.

Figure 3:
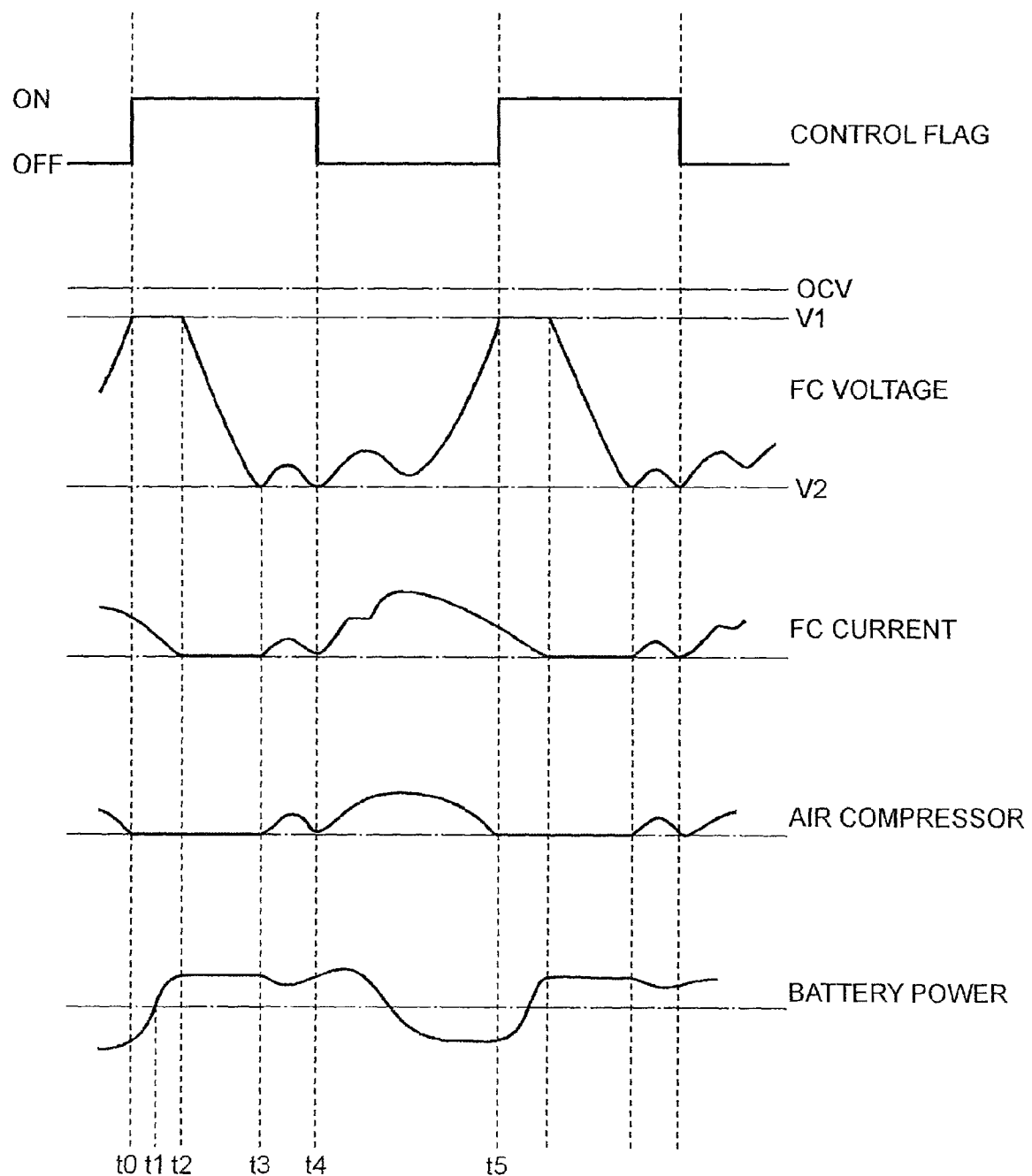
FIG. 3 is a timing chart showing the operation control of the fuel cell system.

FIG. 3 is a timing chart showing the operation control of the fuel cell system 10.

In the fuel cell system 10, the operation mode of the fuel cell stack 20 is switched in accordance with an operation load to improve a power generation efficiency. For example, in a low load region having a low power generation efficiency (an operation region where the power generation request is smaller than a predetermined value), the fuel cell system 10 sets the power generation instruction value of the fuel cell stack 20 to zero to control the operation, and the power required for vehicle running or the power necessary for a system operation is covered by the power from the battery 52 (hereinafter referred to as the first operation mode). On the other hand, in a high load region having a high power generation efficiency (an operation region where the power generation request is the predetermined value or more), the power generation instruction value of the fuel cell stack 20 is calculated based on the accelerator open degree, the vehicle speed or the like to control the operation, and the power required for the vehicle running or the power necessary for the system operation is covered by the only power generated by the fuel cell stack 20, or the power generated by the fuel cell stack 20 and the power from the battery 52 (hereinafter referred to as the second operation mode).

The fuel cell system 10 monitors a control flag indicating the operation mode for a given period, controls the operation in the first operation mode when the control flag turns on, and controls the operation in the second operation mode when the control flag turns off. In any operation mode, the output voltage of the fuel cell stack 20 during a usual operation is in principle limited to an operation range between a use upper limit voltage V1 and a use lower limit voltage V2.

The use upper limit voltage V1 is preferably a voltage which satisfies the condition of a voltage range where the platinum catalyst included in the catalyst layers 23a, 24a of the fuel cell stack 20 is not eluted. Furthermore, in addition to the condition, the voltage preferably satisfies the condition of a voltage range where the power generated by the fuel cell stack 20 can be consumed by the auxiliary machines 55, when the output voltage of the fuel cell stack 20 keeps the use upper limit voltage V1 while stopping the supply of the reactant gas to the fuel cell stack 20. In the fuel cell stack 20, especially when the cathode pole 24 is held at a high potential during a low-density current operation or during an idle operation, the platinum catalyst of the catalyst layer 24a might be eluted. In the present description, when the output voltage of the fuel cell stack 20 is controlled to the use upper limit voltage V1 or less to keep the durability of the fuel cell stack 20, the control is referred to as the high-potential avoiding control. Moreover, the use upper limit voltage V1 is referred to as the high-potential avoiding voltage sometimes. According to the present embodiment, in any operation mode, the high-potential avoiding control is in principle executed. The use upper limit voltage V1 is preferably set so that the voltage per cell is, for example, about 0.9 V.

The use lower limit voltage V2 is preferably a voltage which satisfies the condition of a voltage range where the cell voltage does not lower to a reduction region. When the fuel cell stack 20 is continuously operated in an oxidization region, an oxidized membrane is formed on the surface of the platinum catalyst included in the catalyst layer 24a, whereby the effective area of the platinum catalyst decreases. Then, an active voltage increases, and hence the I-V characteristics of the fuel cell stack 20 lower. When catalyst activation processing is performed to reduce the oxidized membrane and remove the oxidized membrane from the platinum catalyst, the I-V characteristics can be recovered. However, when the cell voltage is frequently varied between the oxidization region and the reduction region, the durability of the fuel cell stack 20 lowers. Moreover, when the cell voltage is lowered to the reduction region and then the cell voltage is raised to the oxidization region in accordance with the increase of the request load, carbon carrying the platinum catalyst is oxidized sometimes. When such a situation is taken into consideration and the output voltage of the fuel cell stack 20 during the usual operation is controlled to the use lower limit voltage V2 or more, the deterioration of the durability of the fuel cell stack 20 can be suppressed. The use lower limit voltage V2 is preferably set so that the voltage per cell is, for example, about 0.8 V.

It is to be noted that the output voltage of the fuel cell stack 20 during the usual operation is in principle controlled between the use upper limit voltage V1 and the use lower limit voltage V2, but as required for the system operation, the output voltage of the fuel cell stack 20 is controlled to the use upper limit voltage V1 or more, or the use lower limit voltage V2 or less sometimes. When the SOC of the battery 52 is, for example, a predetermined value or more, when gas leakage is detected or when regenerative power is collected by the regenerative braking or the like, the output voltage of the fuel cell stack 20 is raised to an open end voltage. Moreover, when the catalyst activation processing is performed, the output voltage of the fuel cell stack 20 is lowered to the use lower limit voltage V2 or less.

Meanwhile, in the first operation mode, the controller 70 sets the power generation instruction value to zero, stops the supply of the reactant gas to the fuel cell stack 20, and sets a voltage instruction value to the DC/DC converter 51 to the use upper limit voltage V1 (time t0 to t4). Even after the supply of the reactant gas is stopped, the unreacted reactant gas remains in the fuel cell stack 20, and hence the fuel cell stack 20 generates a slight amount of power for a while.

A period of the time t0 to t2 is a power generation period when the chemical energy of the remaining reactant gas is converted into electric energy to continue the generation of the slight amount of power. In this power generation period, the remaining reactant gas has such energy that the output voltage of the fuel cell stack 20 can keep the use upper limit voltage V1, and hence the output voltage of the fuel cell stack 20 continues to keep the use upper limit voltage V1. The power generated in this power generation period is consumed by the auxiliary machines 55. However, when the power cannot completely be consumed by the auxiliary machines 55, the power is charged into the battery 52.

In the period of the time t0 to t1, the power generation energy of the fuel cell stack 20 exceeds the consumption capacity of the auxiliary machines 55, and hence a part of the power generation energy is charged into the battery 52. However, the power generation energy released from the fuel cell stack 20 gradually decreases in accordance with the consumption of the remaining reactant gas. Therefore, at the time t1, the power generation energy released from the fuel cell stack 20 is balanced with the consumption capacity of the auxiliary machines 55, and the power charged into the battery 52 is zeroed. Moreover, in the period of the time t1 to the time t2, the power generation energy released from the fuel cell stack 20 cannot cover the power consumption of the auxiliary machines 55, and hence to compensate for the shortage of the power, the battery 52 supplies the power to the auxiliary machines 55.

A period of the time t2 to t4 is a power generation stop period when the remaining reactant gas is consumed, and hence the output voltage of the fuel cell stack 20 cannot keep the use upper limit voltage V1 any more, thereby resulting in the stop of the power generation. When the remaining reactant gas does not have any energy necessary for keeping the output voltage of the fuel cell stack 20 at the use upper limit voltage V1, the power generation is stopped, and the output voltage of the fuel cell stack 20 gradually lowers. In this power generation stop period, the power generation energy of the fuel cell stack 20 is zeroed, so that the power supplied from the battery 52 to the auxiliary machines 55 becomes substantially constant.

At the time t3 when the output voltage of the fuel cell stack 20 lowers to the use lower limit voltage V2, the oxidizing gas supply system 30 is driven to resupply the oxidizing gas to the fuel cell stack 20. Since the fuel cell stack 20 receives the resupplied oxidizing gas to generate the power, the output voltage of the fuel cell stack 20 starts to rise. In a stage where the output voltage of the fuel cell stack 20 rises to a predetermined voltage (e.g., 360 V), the resupply of the oxidizing gas ends. Thus, in the power generation stop period, every time the output voltage of the fuel cell stack 20 lowers to the use lower limit voltage V2, the oxidizing gas is appropriately resupplied, and the output voltage is controlled so that the voltage does not become lower than the use lower limit voltage V2.

In the second operation mode, the controller 70 calculates the power generation instruction value in accordance with the request load, controls the supply of the reactant gas to the fuel cell stack 20, and controls the operation point (the output voltage, the output current) of the fuel cell stack 20 through the DC/DC converter 51 (the time t4 to time t5). At this time, the voltage instruction value to the DC/DC converter 51 is limited to an operation range between the use upper limit voltage V1 and the use lower limit voltage V2.

FIG. 4 is an explanatory view showing the outline of the executing conditions of the catalyst activation processing.

As shown in the drawing, when the fuel cell vehicle is stopped and the operation mode is the first operation mode, the performing of the catalyst activation processing is allowed.

Here, the details of the catalyst activation processing will be described. In the fuel cell stack 20, as represented by the above formula (1), the hydrogen ions formed in the anode pole 23 pass through the electrolytic film 22 to move to the cathode pole 24. As represented by the above formula (2), the hydrogen ions which have moved to the cathode pole 24 cause an electrochemical reaction with oxygen in the oxidizing gas supplied to the cathode pole 24, and generates the reducing reaction of oxygen. In consequence, the surface of the platinum catalyst of the catalyst layer 24a is covered with the oxidized membrane to increase a reaction resistance (an overvoltage), and the power generation efficiency (output characteristics) lowers. The catalyst activation processing is processing of lowering the cell voltage to a reduction potential to reduce the oxidized membrane and remove the oxidized membrane from the catalyst surface. More specifically, the voltage of each cell, that is, the output voltage of the fuel cell stack is lowered to increase the output current, thereby shifting the electrochemical reaction in the catalyst layer 24a from an oxidizing reaction region to a reducing reaction region to recover catalyst activity.

It is to be noted that conditions that the fuel cell vehicle is stopped and that the operation mode is the first operation mode are minimum conditions for allowing the catalyst activation processing. To allow the performing of the catalyst activation processing, for the sake of the convenience of the system operation, other conditions are preferably taken into consideration (details will be described later).

Figure 5:
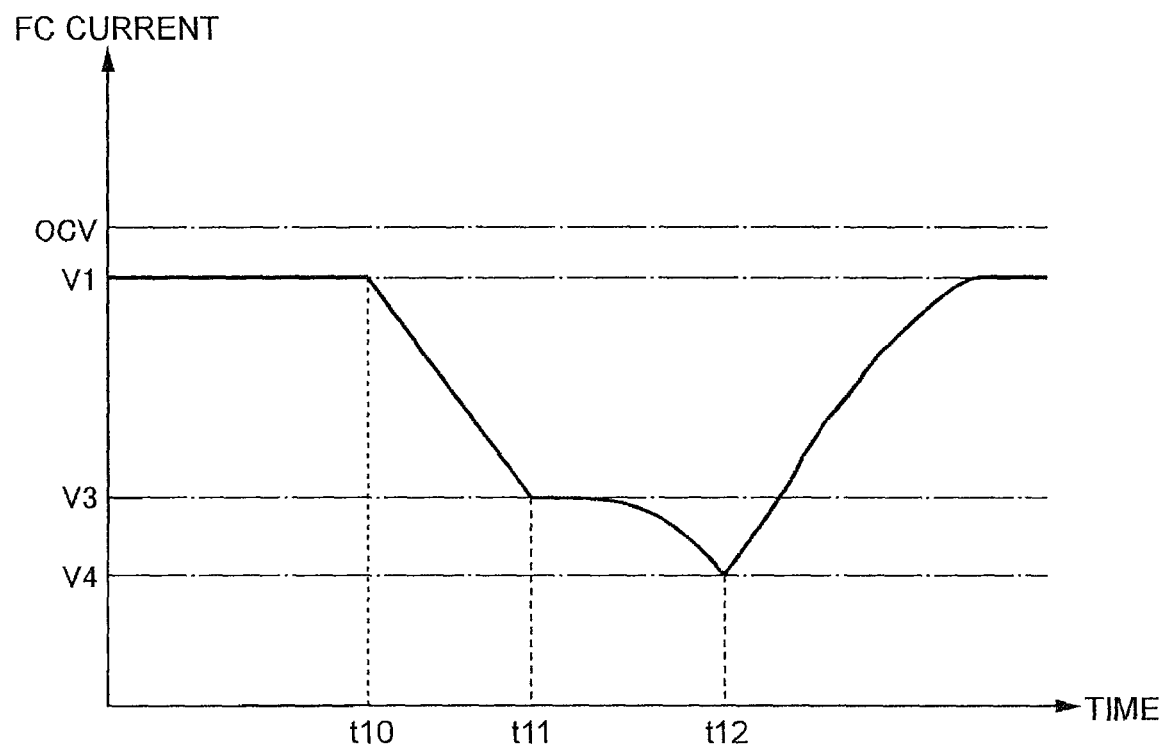
FIG. 5 is a timing chart showing the change of the output voltage of the fuel cell stack during the catalyst activation processing.

FIG. 5 is a timing chart showing the change of the output voltage of the fuel cell stack 20 during the catalyst activation processing.

As described above, when the fuel cell vehicle is stopped and the operation mode is the first operation mode, the catalyst activation processing is performed. In the catalyst activation processing, the controller 60 continues the supply of the fuel gas to the fuel cell stack 20, while stopping the supply of the oxidizing gas and linearly gradually decreasing the voltage instruction value to the DC/DC converter 51 from the use upper limit voltage V1 to a reduction voltage V3 (time t10 to t11). The reduction voltage V3 needs to be in a voltage range where the oxidized membrane covering the platinum catalyst can be reduced to remove the oxidized membrane, and is preferably set so that the voltage per cell is, for example, about 0.7 V.

It is to be noted that in the first operation mode, the supply of the fuel gas to the fuel cell stack 20 is in principle stopped, and the supply of the oxidizing gas is also stopped, but in the catalyst activation processing, the only supply of the oxidizing gas is stopped, while continuing the supply of the fuel gas to the fuel cell stack 20. This is because if the supply of the fuel gas is also sopped, the pole of each cell 21 shifts, and might be damaged.

After the time t11 when the output voltage of the fuel cell stack 20 reaches the reduction voltage V3, the controller 60 keeps the voltage instruction value to the DC/DC converter 51 at the reduction voltage V3. However, since the supply of the oxidizing gas to the fuel cell stack 20 during the catalyst activation processing is stopped, the output voltage of the fuel cell stack 20 cannot keep the reduction voltage V3, finally resulting in the stop of the power generation. Then, the output voltage of the fuel cell stack 20 starts to gradually lower.

Then, at time t12 when the output voltage of the fuel cell stack 20 lowers to an air blow voltage V4, the controller 60 drives the air compressor 33 again to resupply the oxidizing gas to the fuel cell stack 20. The air blow voltage V4 needs to be in a voltage range where the cell voltage does not excessively lower, and is preferably set so that the voltage per cell is, for example, about 0.65 V.

It is to be noted that when the oxidizing gas is resupplied, the output voltage of the fuel cell stack 20 starts to rise, but the output voltage of the fuel cell stack 20 is limited by the DC/DC converter 51 so that the voltage does not exceed the use upper limit voltage V1.

FIG. 6 is an explanatory view showing the details of the executing conditions of the catalyst activation processing.

As shown in the drawing, to allow the performing of the catalyst activation processing, it is necessary to satisfy all conditions: (A1) a vehicle speed is VC1 or less; (B1) the operation mode is the first operation mode; (C1) a charging capability Win of the battery 52 is W1 or less; (D1) it is not judged that gas leakage is detected; and (E1) the air compressor 33 is stopped. On the other hand, to prohibit the performing of the catalyst activation processing, it is necessary to satisfy one of conditions: (A2) the vehicle speed is VC2 or less; (B2) the operation mode is a mode other than the first operation mode; (C2) the charging capability W1n of the battery 52 is W2 or more; (D2) it is judged that the gas leakage is detected; and (E2) the air compressor 33 is operating.

(Vehicle Running State)

In the catalyst activation processing, the output voltage of the fuel cell stack 20 is lowered to the reduction voltage V3. Therefore, in a case where it is assumed that an accelerator is turned on in this state and that the operation mode is switched from the first operation mode to a second operation mode, the cell voltage is lowered, hence any output following accelerator response during a request for a high load cannot be obtained, and drivability might remarkably deteriorate. In this case, to perform the catalyst activation processing, a condition that the vehicle is stopped is a necessary condition. When the vehicle is running, the performing of the catalyst activation processing is prohibited. More specifically, the necessary condition for performing the catalyst activation processing is a condition that the vehicle speed is VC1 (e.g., 0.5 km/h) or less. When the vehicle speed is VC2 (e.g., 3.0 km/h) or more, the performing of the catalyst activation processing is prohibited.

(Operation Mode)

To allow the performing of the catalyst activation processing, the operation mode needs to be the first operation mode. When the operation mode is the mode other than the first operation mode (e.g., the second operation mode, or a state such as system startup or stop), the catalyst activation processing is prohibited. In the first operation mode, the supply of the oxidizing gas to the fuel cell stack 20 is stopped. Therefore, in a case where the catalyst activation processing is performed, even when the output voltage of the fuel cell stack 20 is forcibly lowered, the generated power (the surplus power) can be minimized. In other words, when the catalyst activation processing is performed in the first operation mode, the output voltage of the fuel cell stack 20 can be lowered to a reduction potential, while controlling the charging so that the battery 52 is not overcharged.

(Battery Charging Capability)

During the catalyst activation processing, a part of the surplus power generated by the fuel cell stack 20 is consumed by the auxiliary machines 55, but a large part of the surplus power is charged into the battery 52. When the charging capability of the battery 52 deteriorates, the surplus power cannot sufficiently be charged, and hence the performing of the catalyst activation processing is prohibited. More specifically, the condition for performing the catalyst activation processing is a condition that the charging capability of the battery 52 is W1 (e.g., −6 kW) or less. When the charging capability is W2 (e.g., −5 kW) or more, the performing of the catalyst activation processing is prohibited.

(Gas Leakage Judgment)

When the block valves H3, H4 are closed, a closed space is formed in the fuel gas piping system, and the gas pressure fluctuation in the closed space is read by the pressure sensor 74 to perform the gas leakage detection for judging whether or not the hydrogen gas leaks. In this case, when the catalyst activation processing is performed, the gas leakage detection cannot correctly be performed by the consumption of the fuel gas by the fuel cell stack 20 sometimes. Therefore, a condition that the gas leakage detection is not performed is the necessary condition of the catalyst activation processing. When the gas leakage judgment is performed, the performing of the catalyst activation processing is prohibited.

(Air Compressor)

When the catalyst activation processing is performed during the operation of the air compressor 33 to lower the output voltage of the fuel cell stack 20, the power generated by the fuel cell stack 20 increases, and the battery 52 is overcharged sometimes. Therefore, a condition that the air compressor 33 is stopped is the necessary condition of the catalyst activation processing. When the air compressor 33 is operating, the performing of the catalyst activation processing is prohibited.

It is to be noted that one example of the conditions for performing the catalyst activation processing has been described, and the present invention is not limited to the above example. As the conditions for allowing or prohibiting the performing of the catalyst activation processing, another condition may be added, or the above condition contents may appropriately be changed. For example, when the catalyst activation processing is frequently repeated, the durability of the fuel cell stack 20 deteriorates. Therefore, only when it is judged that the catalyst activation processing is necessary for a reason such as a reason that the deterioration of the I-V characteristics is considered, the catalyst activation processing is preferably performed.

Figure 7:
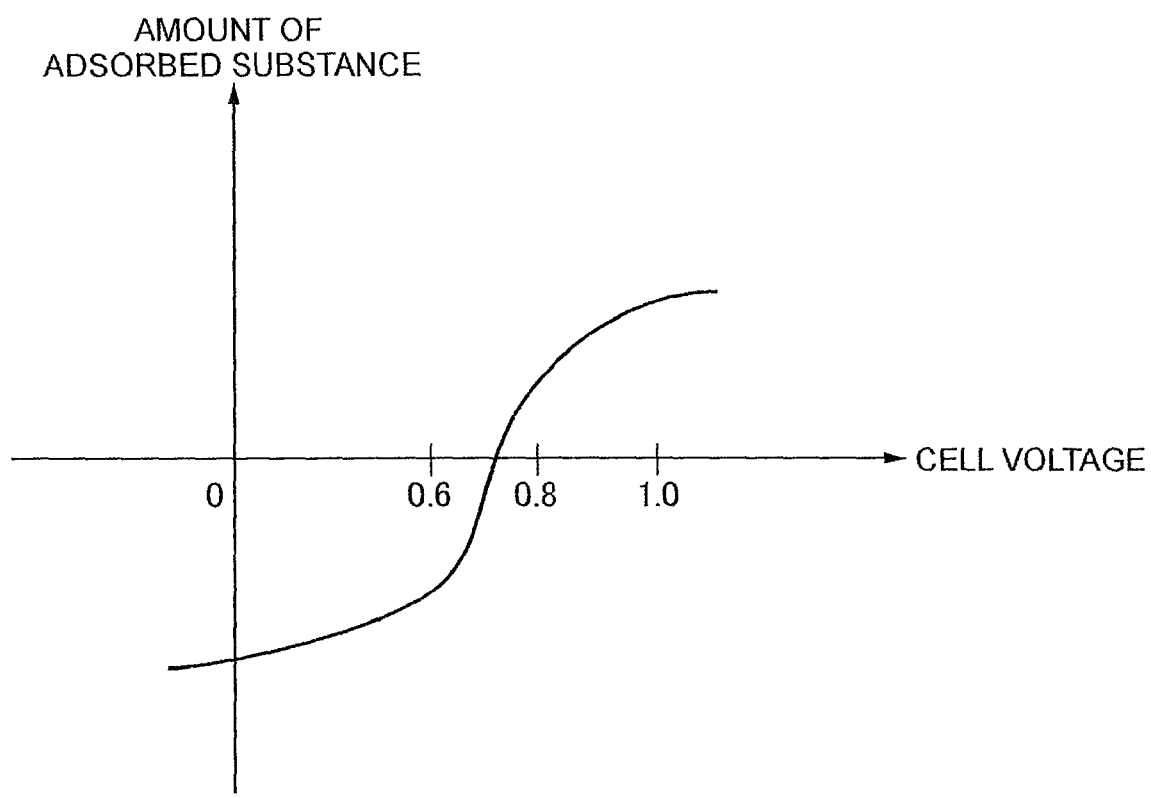
FIG. 7 is a graph showing a relation between a cell voltage and the amount of an oxidized membrane to be adsorbed.

FIG. 7 is a graph showing a relation between the cell voltage and the amount of the oxidized membrane to be adsorbed.

As shown in this graph, in the oxidization region where the cell voltage is about 0.75 V or more, as the cell voltage is high, the amount of the oxidized membrane to be adsorbed by the platinum catalyst increases. Moreover, as a time when the cell voltage resides in the oxidization region is long, the amount of the oxidized membrane to be adsorbed increases. On the other hand, in the reduction region where the cell voltage is about 0.75 V or less, as the cell voltage is low, the amount of the oxidized membrane to be peeled from the platinum catalyst increases. Moreover, as the time when the cell voltage resides in the reduction region is long, the amount of the oxidized membrane to be peeled increases. Therefore, based on the graph shown in the drawing, when positive time integration is performed in the oxidization region and negative time integration is performed in the reduction region, the amount of the oxidized membrane to be adsorbed by the platinum catalyst can be estimated. When the amount of the oxidized membrane to be adsorbed by the platinum catalyst increases, the effective area of the platinum catalyst that contributes the electrochemical reaction decreases, so that a current density rises, thereby causing the increase of the overvoltage. In a case where the catalyst activation processing is performed when the amount of the oxidized membrane to be adsorbed exceeds a predetermined threshold value, the number of the performing times of the catalyst activation processing can be minimized.

It is to be noted that 0.75 V is merely illustrated above, and the present invention is not limited to this voltage value.

Figure 8:
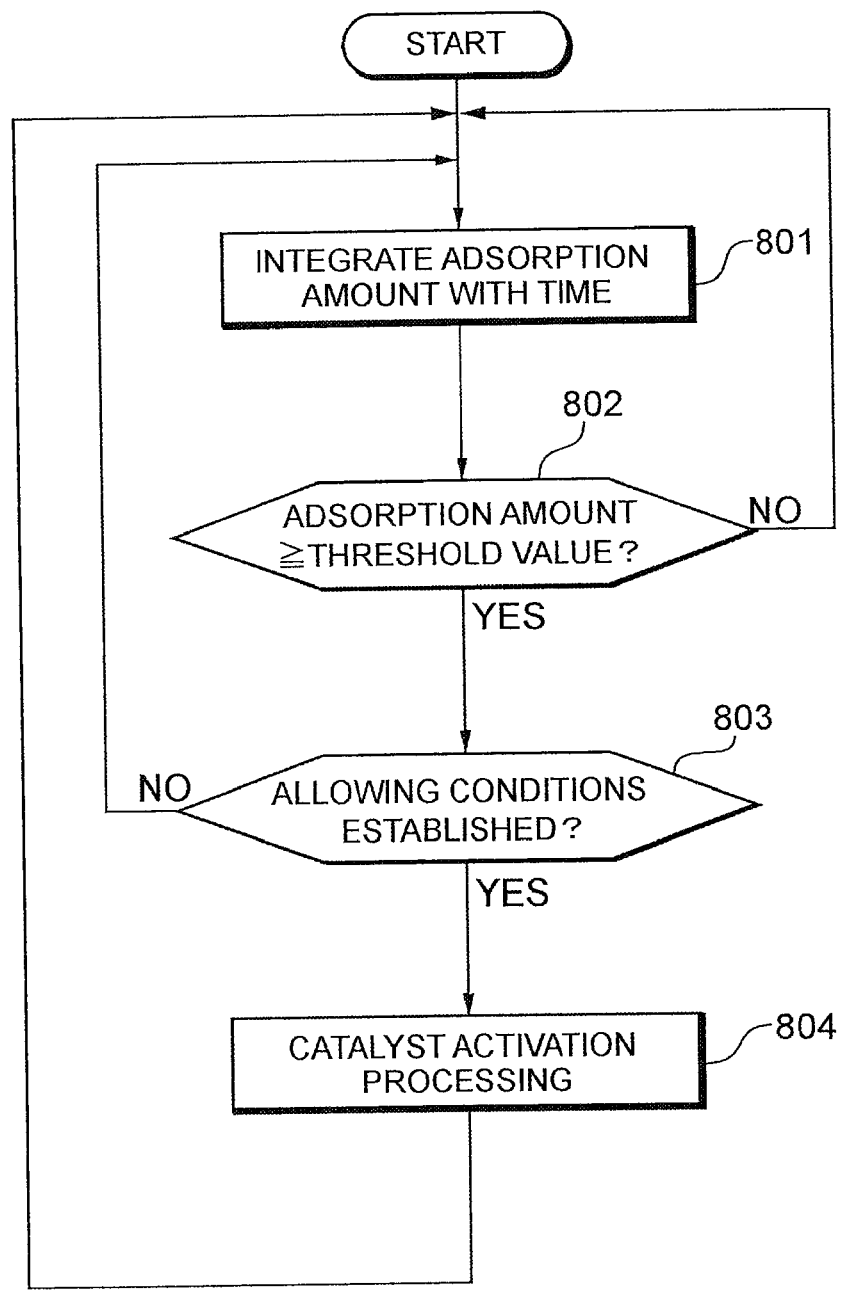
FIG. 8 is a flow chart showing a procedure for performing the catalyst activation processing on a condition that the amount of the oxidized membrane to be adsorbed exceeds a predetermined threshold value.

FIG. 8 is a flow chart showing a procedure for performing the catalyst activation processing on a condition that the amount of the oxidized membrane to be adsorbed exceeds a predetermined threshold value.

The controller 60 time-integrates the amount of the oxidized membrane to be adsorbed based on time elapsed from the performing of the previous catalyst activation processing (a step 801), and judges whether or not the adsorption amount exceeds the predetermined threshold value (a step 802). When the amount of the oxidized membrane to be adsorbed does not exceed the predetermined threshold value (the step 802; NO), the controller 60 repeatedly executes the steps 801 and 802.

When the amount of the oxidized membrane to be adsorbed exceeds the predetermined threshold value (the step 802; YES), the controller 60 judges whether or not all of the conditions (A1) to (E1) for allowing the performing of the catalyst activation processing are satisfied (a step 803). When any one of the conditions (A1) to (E1) is not established (the step 803; NO), the controller returns to the step 801. On the other hand, when all of the conditions (A1) to (E1) are established (the step 803; YES), the controller 60 performs the catalyst activation processing (a step 804).

It is to be noted that while the catalyst activation processing is performed, the cell voltage is present in the reduction region, and hence the negative time integration of the amount of the oxidized membrane to be adsorbed is performed in accordance with the performing time of the catalyst activation processing (the step 801).

Figure 9:
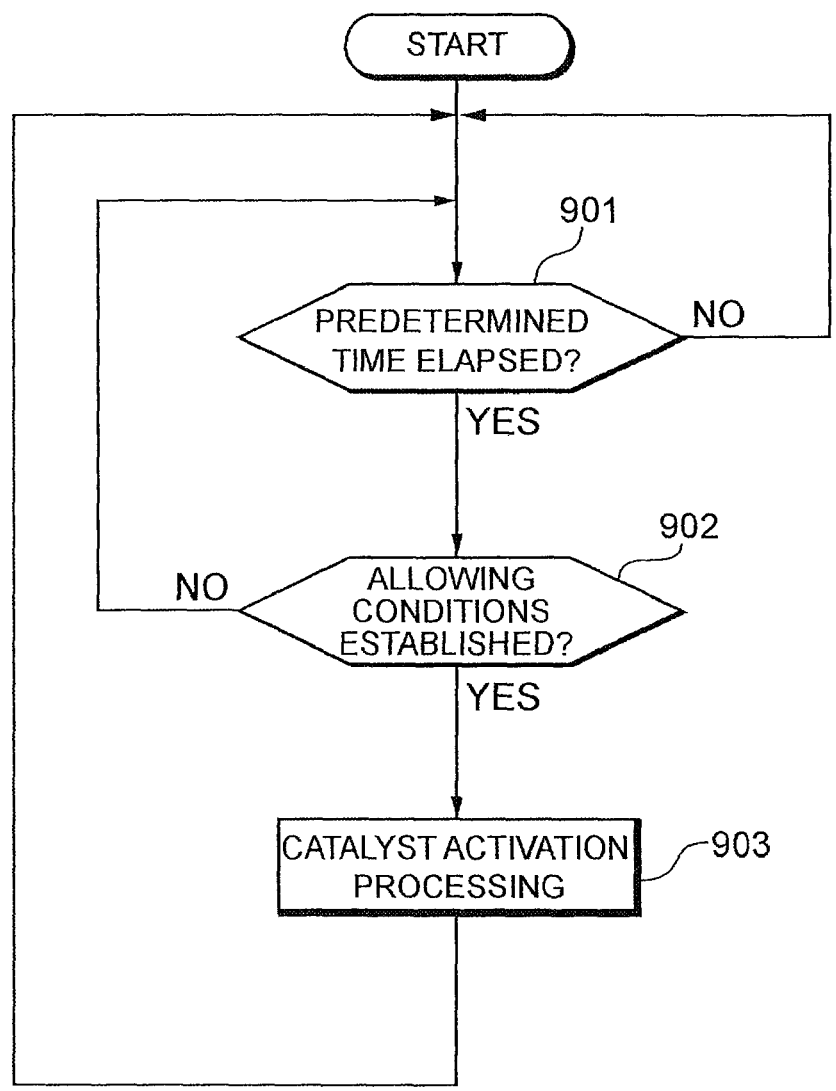
FIG. 9 is a flow chart showing a first procedure for performing the catalyst activation processing on a condition that a predetermined time has elapsed from the previous catalyst activation processing.

FIG. 9 is a flow chart showing a first procedure for performing the catalyst activation processing on a condition that a predetermined time has elapsed from the previous catalyst activation processing.

The controller 60 judges whether or not the time elapsed from the previous catalyst activation processing exceeds a predetermined time (a step 901). When the time elapsed from the previous catalyst activation processing does not exceed the predetermined time (the step 901; NO), the controller 60 repeatedly executes the judgment of the step 901.

When the time elapsed from the previous catalyst activation processing exceeds the predetermined time (the step 901; YES), the controller 60 judges whether or not all of the conditions (A1) to (E1) for allowing the performing of the catalyst activation processing are satisfied (a step 902). When any one of the conditions (A1) to (E1) is not established (the step 902; NO), the controller returns to the step 901. On the other hand, when all of the conditions (A1) to (E1) are established (the step 902; YES), the controller 60 performs the catalyst activation processing (a step 903), to return to the judgment processing of the step 901.

Thus, when the catalyst activation processing is performed on the convention that the time elapsed from the previous catalyst activation processing exceeds the predetermined time, the number of the performing times of the catalyst activation processing can be minimized.

Figure 10:
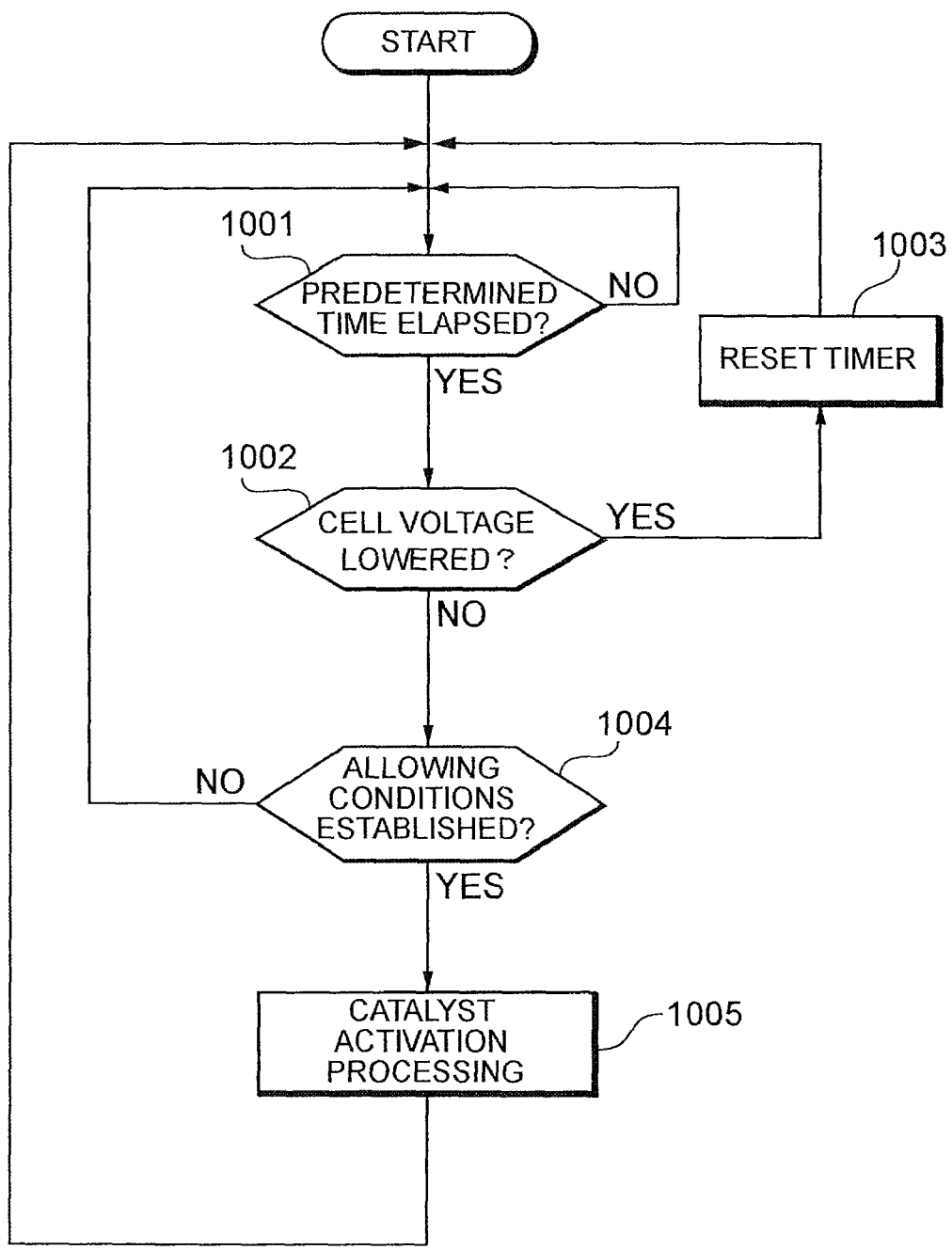
FIG. 10 is a flow chart showing a second procedure for performing the catalyst activation processing on the condition that the predetermined time has elapsed from the previous catalyst activation processing.

FIG. 10 is a flow chart showing a second procedure for performing the catalyst activation processing on the condition that the predetermined time has elapsed from the previous catalyst activation processing.

The controller 60 judges whether or not the time elapsed from the previous catalyst activation processing (or a time elapsed from the reset of a timer) exceeds a predetermined time (a step 1001). When the time elapsed from the previous catalyst activation processing (or the time elapsed from the reset of the timer) does not exceed the predetermined time (the step 1001; NO), the controller 60 repeatedly executes the judgment processing of the step 1001.

When the time elapsed from the previous catalyst activation processing exceeds the predetermined time (the step 1001; YES), the controller 60 judges whether or not the cell voltage has lowered to the reduction region after the performing of the previous catalyst activation processing (a step 1002).

When the cell voltage has lowered to the reduction region (the step 1002; YES), the controller 60 resets the time for measuring the time elapsed from the previous catalyst activation processing (a step 1003).

When the cell voltage has not lowered to the reduction region (the step 1002; NO), the controller 60 judges whether or not all of the conditions (A1) to (E1) for allowing the performing of the catalyst activation processing are satisfied (a step 1004). When any one of the conditions (A1) to (E1) is not established (the step 1004; NO), the controller returns to the step 1001. On the other hand, when all of the conditions (A1) to (E1) are established (the step 1004; YES), the controller 60 performs the catalyst activation processing (a step 1005), to return to the judgment processing of the step 1001.

Thus, even in a case where the time elapsed from the performing of the previous catalyst activation processing exceeds the predetermined time, when the cell voltage lowers to the reduction region after performing the previous catalyst activation processing, the performing of the catalyst activation processing can be omitted to minimize the number of the performing times of the catalyst activation processing.

Figure 11:
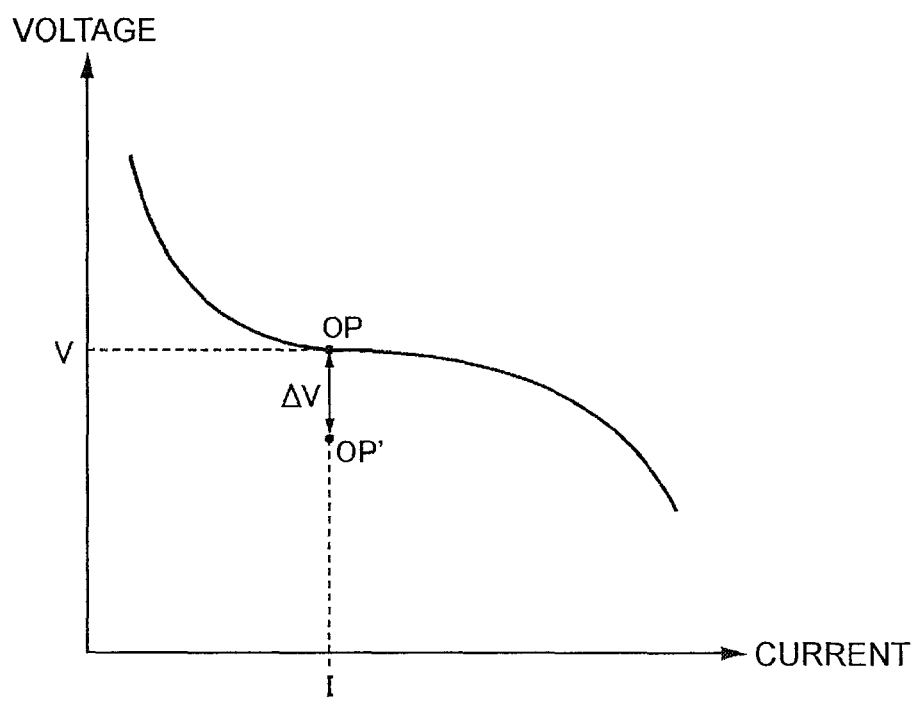
FIG. 11 is an explanatory view showing the deterioration of the I-V characteristics of the fuel cell stack caused by the adsorption of the oxidized membrane by a platinum catalyst.

FIG. 11 is an explanatory view showing the deterioration of the I-V characteristics of the fuel cell stack 20 caused by the adsorption of the oxidized membrane by the platinum catalyst.

When the fuel cell stack 20 is continuously operated in the oxidization region, the oxidized membrane is formed on the surface of the platinum catalyst to increase the overvoltage, and hence the I-V characteristics deteriorate. When the operation point in an ideal state is, for example, OP(I, V), the operation point in a state in which the oxidized membrane is formed on the surface of the platinum catalyst is OP'(I, V−ΔV). The output voltage at a time when a current I is swept from the fuel cell stack 20 lowers as much as ΔV. Therefore, when the lowering amount ΔV of the output characteristics of the fuel cell stack 20 exceeds a predetermined threshold value, the catalyst activation processing is preferably performed.

Figure 12:
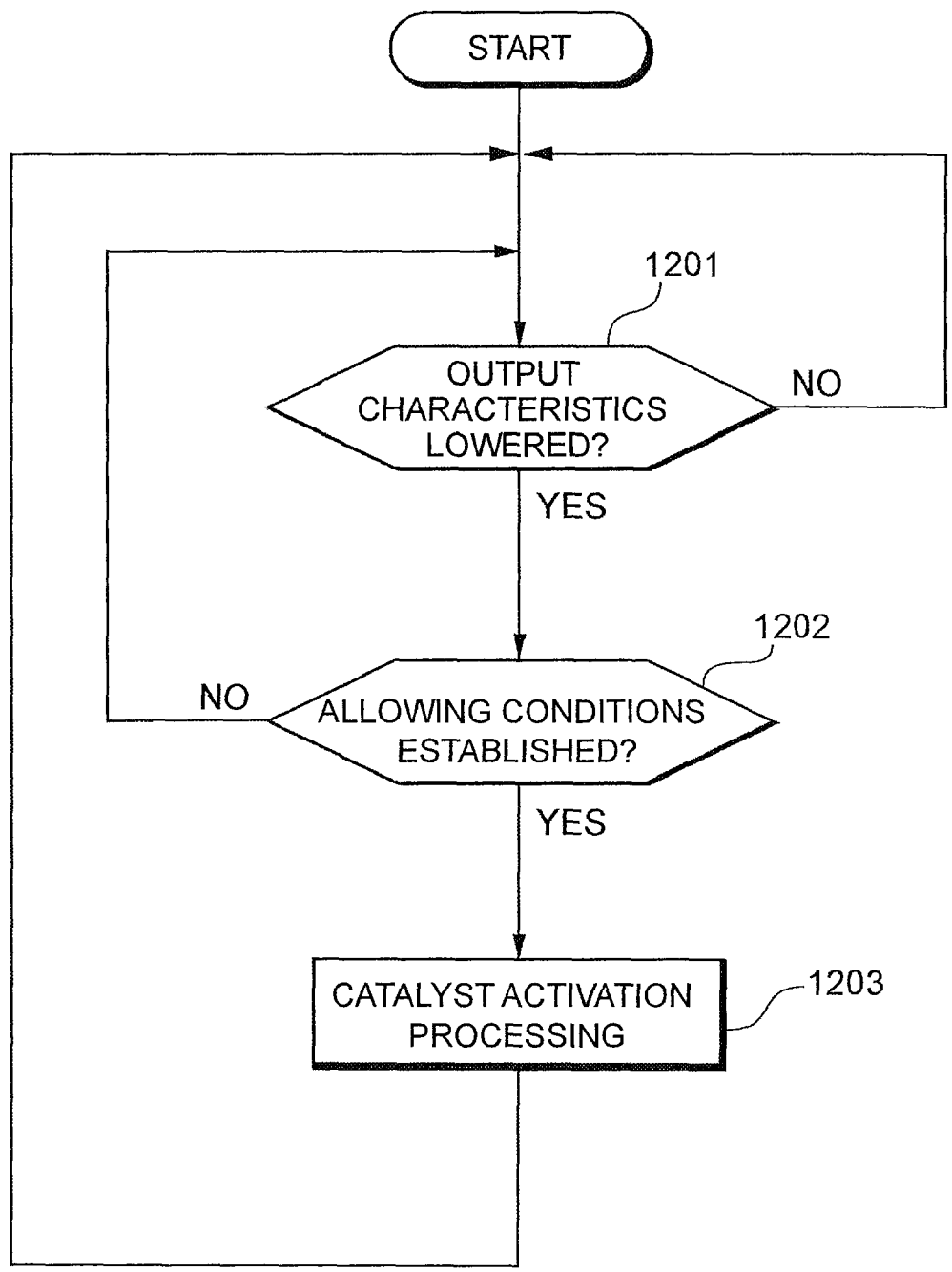
FIG. 12 is a flow chart showing a procedure for performing the catalyst activation processing on a condition that the lowering amount of the output characteristics of the fuel cell stack exceeds a predetermined threshold value.

FIG. 12 is a flow chart showing a procedure for performing the catalyst activation processing on a condition that the lowering amount of the output characteristics of the fuel cell stack 20 exceeds a predetermined threshold value.

The controller 60 judges whether or not the lowering amount ΔV of the output characteristics of the fuel cell stack 20 exceeds the predetermined value (a step 1201). When the lowering amount ΔV does not exceed the predetermined threshold value (the step 1201; NO), the controller 60 repeatedly executes the judgment processing of the step 1201.

When the lowering amount ΔV exceeds the predetermined threshold value (the step 1201; YES), the controller 60 judges whether or not all of the conditions (A1) to (E1) for allowing the performing of the catalyst activation processing are satisfied (a step 1202). When any one of the conditions (A1) to (E1) is not established (the step 1202; NO), the controller returns to the step 1201. On the other hand, when all of the conditions (A1) to (E1) are established (the step 1202; YES), the controller 60 performs the catalyst activation processing (a step 1203), to return to the judgment processing of the step 1201.

Thus, in a case where the catalyst activation processing is performed when the lowering amount ΔV of the output characteristics of the fuel cell stack 20 exceeds the predetermined threshold value, the number of the performing times of the catalyst activation processing can be minimized.

Figure 13:
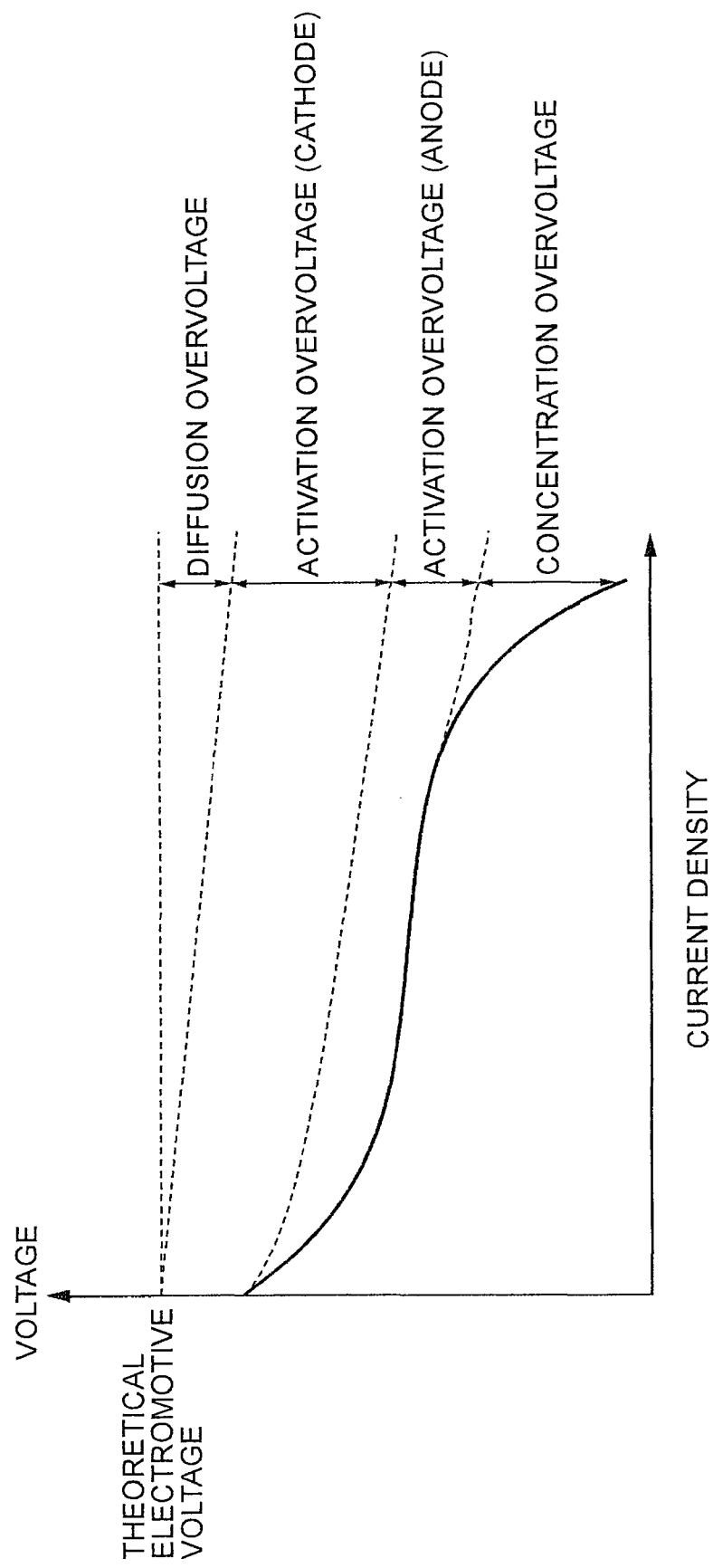
FIG. 13 is an explanatory view showing the overvoltage of the fuel cell stack.

FIG. 13 is an explanatory view showing the overvoltage of the fuel cell stack 20.

As shown in the drawing, the overvoltage is constituted of an activation overvoltage ηa, a concentration overvoltage ηc and a resistance overvoltage The activation overvoltage is energy consumed to activate the hydrogen gas and the oxidizing gas having a ground state, respectively. The concentration overvoltage is energy consumed when equilibrium deviates owing to the reaction on electrodes and both a reaction system and a forming system make a concentration difference to cause diffusion movement. The resistance overvoltage generically includes the electric resistances of the polymer electrolytic film 22, the anode pole 23, the cathode pole 24 and the separators 26, 27 themselves, and the contact resistances of them. These overvoltages can be calculated by equations (4) to (6):

$$\eta a = a - b \times \log I \quad (4);$$

$$\eta c = b \times \log(1 - I/I_L) \quad (5); \text{ and}$$

$$\eta r = IR \quad (6),$$

in which a, b are constants, R is a resistance value, I is a current density, and $I_L$ is a limit current density.

When the fuel cell stack 20 is continuously operated in the oxidization region, the oxidized membrane is formed on the surface of the platinum catalyst, and the activation overvoltage increases, so that the catalyst activation processing is preferably performed when the activation overvoltage exceeds a predetermined threshold value.

Figure 14:
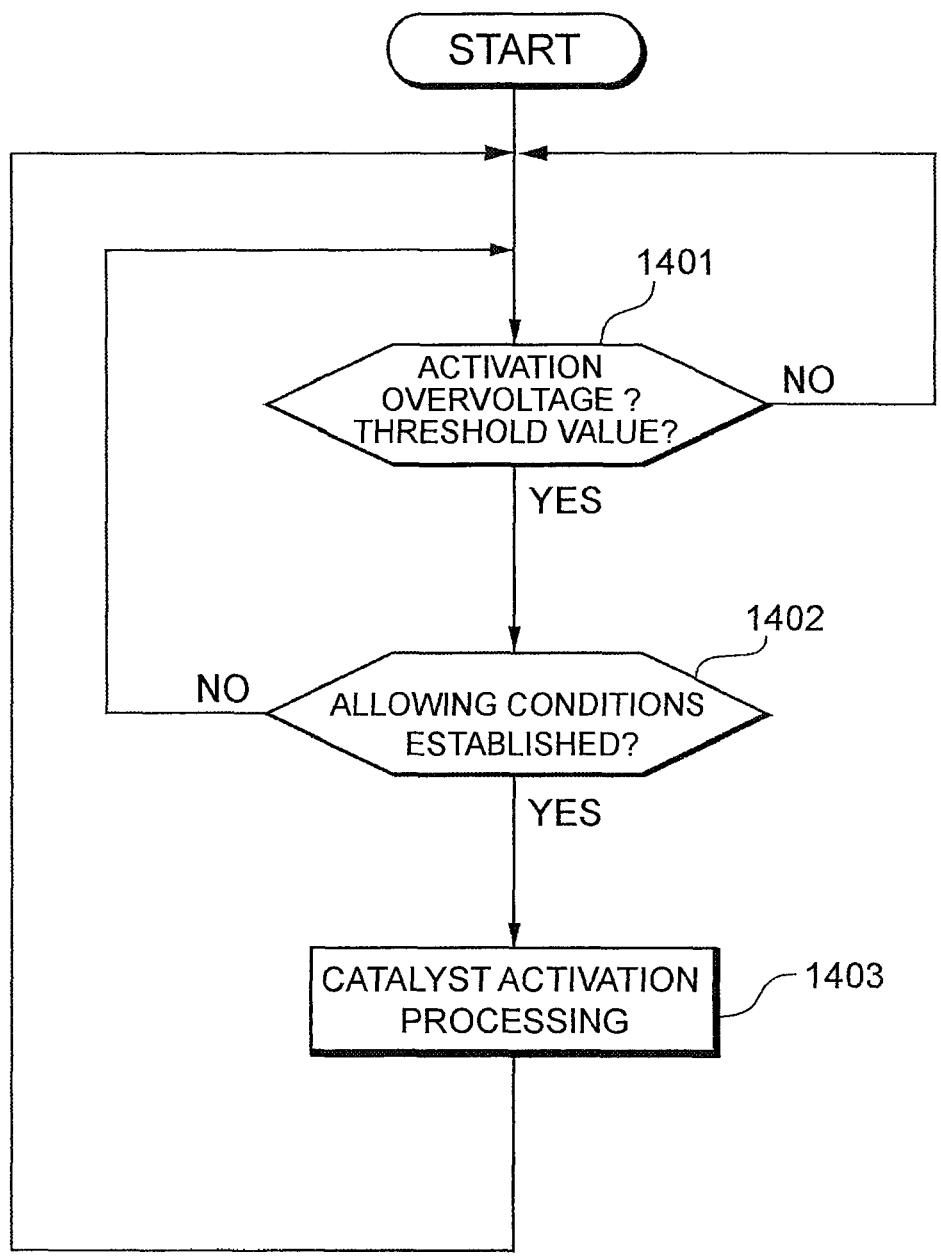
FIG. 14 is a flow chart showing a procedure for performing the catalyst activation processing on a condition that the activation overvoltage of the fuel cell stack exceeds a predetermined threshold value.

FIG. 14 is a flow chart showing a procedure for performing the catalyst activation processing on a condition that the activation overvoltage of the fuel cell stack 20 exceeds a predetermined threshold value.

The controller 60 judges whether or not the activation overvoltage of the fuel cell stack 20 exceeds the predetermined threshold value (a step 1401).

When the activation overvoltage does not exceed the predetermined threshold value (the step 1401; NO), the controller 60 repeatedly executes the judgment step of the step 1401.

When the activation overvoltage exceeds the predetermined threshold value (the step 1401; YES), the controller 60 judges whether or not all of the conditions (A1) to (E1) for allowing the performing of the catalyst activation processing are satisfied (a step 1402). When any one of the conditions (A1) to (E1) is not established (the step 1402; NO), the controller returns to the step 1401. On the other hand, when all of the conditions (A1) to (E1) are established (the step 1402; YES), the controller 60 performs the catalyst activation processing (a step 1403), to return to the judgment processing of the step 1401.

Thus, in a case where the catalyst activation processing is performed when the activation overvoltage of the fuel cell stack 20 exceeds the predetermined threshold value, the number of the performing times of the catalyst activation processing can be minimized.

Embodiment 2

Figure 15:
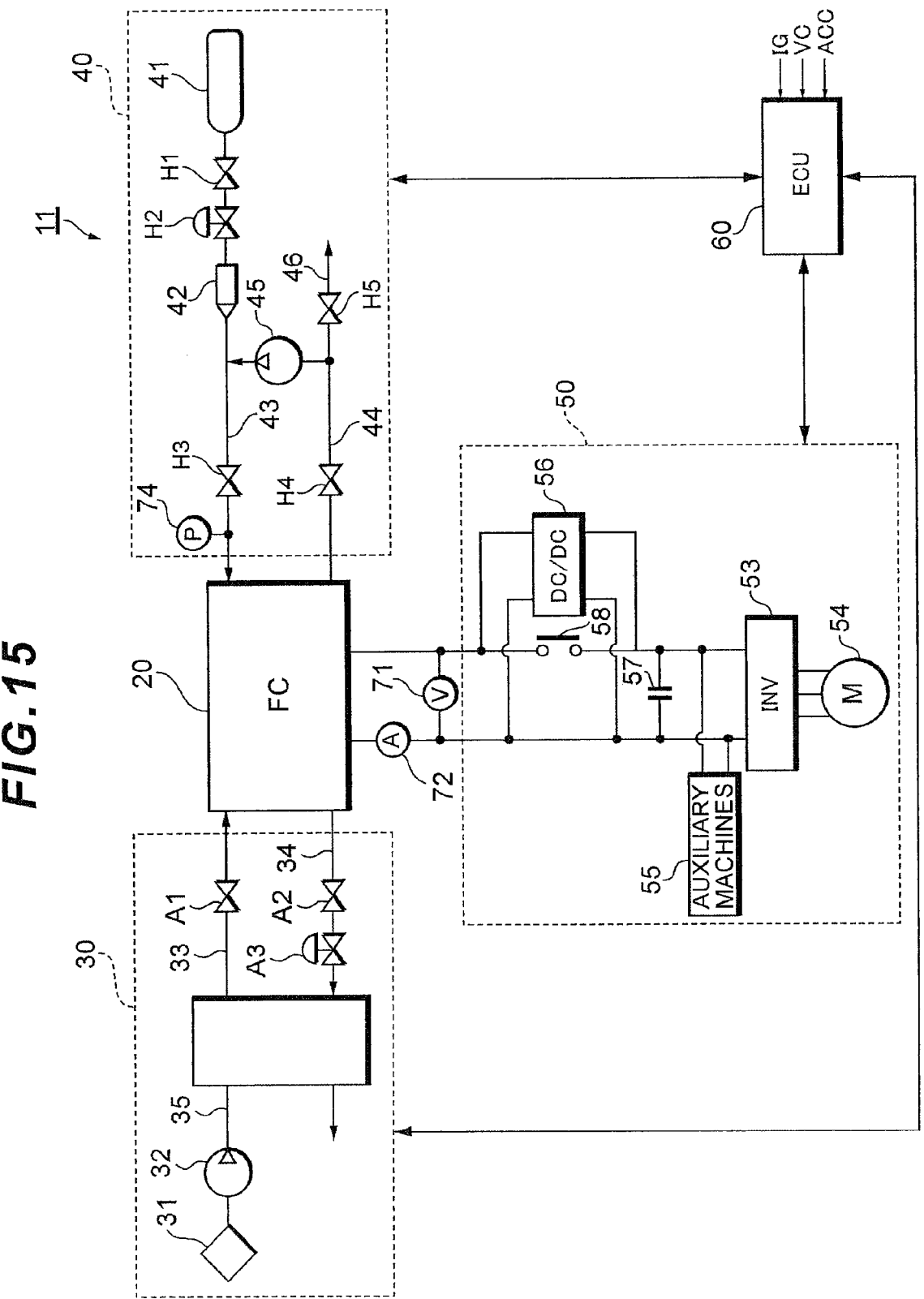
FIG. 15 is a system constitution diagram of a fuel cell system according to Embodiment 2.

FIG. 15 shows a system constitution of a fuel cell system 11 according to Embodiment 2. The fuel cell system 11 has a constitution of a capacitor system in which a capacitor 57 is connected in parallel with a fuel cell stack 20 as a main power source, and a power generated by the fuel cell stack 20 or a regenerative power collected by a traction motor 54 during regenerating braking is charged into the capacitor 57. When the power is necessary for rapid acceleration or the like, the capacitor 57 momentarily takes out the power to realize the system constitution excellent in output characteristics.

A DC/DC converter 56 on a primary side is connected to an output terminal of the fuel cell stack 20, and the DC/DC converter on a secondary side is connected in parallel with the capacitor 57 and a traction inverter 53, respectively. When an operation is controlled in a first operation mode, a controller 60 turns off a relay 58, and controls the output voltage of the fuel cell stack 20 by the DC/DC converter 56. Moreover, when the first operation mode is switched to a second operation mode, on a condition that the output voltage of the fuel cell stack 20 is smaller than the voltage of the capacitor 57, the controller 60 turns on the relay 58, and connects the fuel cell stack 20 in parallel with the capacitor 57.

It is to be noted that catalyst activation processing in the fuel cell system 11 according to Embodiment 2 is similar to that of Embodiment 1.

Embodiment 3

Figure 16:
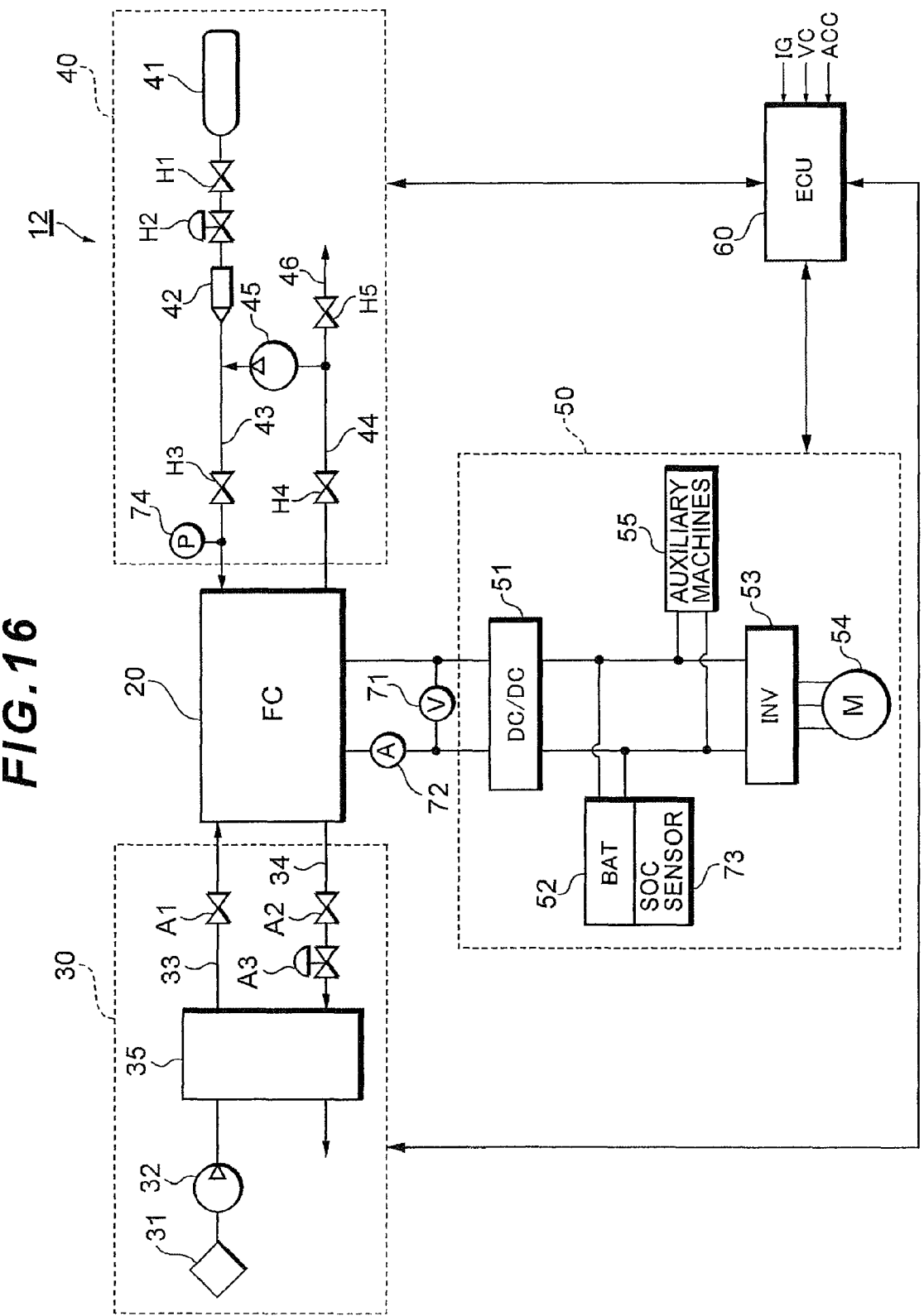
FIG. 16 is a system constitution diagram of a fuel cell system according to Embodiment 3.

FIG. 16 shows a system constitution of a fuel cell system 12 according to Embodiment 3. The fuel cell system 10 according to Embodiment 1 has a constitution of a parallel hybrid system in which the DC/DC converter 51 and the traction inverter 53 are connected in parallel with each other and connected to the fuel cell stack 20, whereas the fuel cell system 12 according to Embodiment 3 has a constitution of a series hybrid system in which a DC/DC converter 51 and a traction inverter 53 are connected in series with a fuel cell stack 20 as a main power source. Both the embodiments are different from each other in this respect.

It is to be noted that catalyst activation processing in the fuel cell system 12 according to Embodiment 3 is similar to that of Embodiment 1.

It is to be noted that in the above embodiments, a utilizing configuration in which the fuel cell system 10 is used as the car-mounted power source system has been illustrated, but the utilizing configuration of the fuel cell system 10 is not limited to this example. For example, the fuel cell system 10 may be mounted as a power source of a mobile body (a robot, a ship, an airplane or the like) other than the fuel cell vehicle. Moreover, the fuel cell system 10 according to the present embodiment may be used as a power generation facility (a stational power generation system) of a housing, a building or the like.

INDUSTRIAL APPLICABILITY

According to the present invention, when a power generation request for a fuel cell is smaller than a predetermined threshold value, the supply of an oxidizing gas to the fuel cell is stopped to perform catalyst activation processing, so that drivability is not impaired and so that a surplus power generated during the catalyst activation processing can be minimized.

The invention claimed is:
1. A fuel cell system comprising:
 a fuel cell configured to receive a supplied fuel gas and oxidizing gas to generate a power;
 a control device programmed to stop the supply of the oxidizing gas to the fuel cell and lower the output voltage of the fuel cell to perform catalyst activation processing when a request power for the fuel cell is smaller than a predetermined value;
 a DC/DC converter configured to control the output voltage of the fuel cell; and
 a capacitor into which the power generated by the fuel cell is charged,
 wherein the DC/DC converter, the capacitor, and a traction inverter are connected in parallel by a relay, and
 wherein when the request power for the fuel cell is smaller than the predetermined value, the control device is programmed to connect an output terminal of the fuel cell to the DC/DC converter by turning off the relay, and control the output voltage of the fuel cell by the DC/DC converter, whereas when the request power for the fuel cell is the predetermined value or more, the control device is programmed to connect the output terminal of the fuel cell to the capacitor to charge the power generated by the fuel cell into the capacitor without using the DC/DC converter, and to the traction inverter, by turning on the relay.

* * * * *

UNITED STATES PATENT AND TRADEMARK OFFICE
CERTIFICATE OF CORRECTION

PATENT NO. : 8,802,310 B2
APPLICATION NO. : 13/472088
DATED : August 12, 2014
INVENTOR(S) : Kenji Umayahara et al.

It is certified that error appears in the above-identified patent and that said Letters Patent is hereby corrected as shown below:

In the Specification

At column 11, line 42, change "capability $W1n$ of the" to -- capability $Win$ of the --.

At column 15, line 31, change "overvoltage The" to -- overvoltage ŋr. The --.

At column 15, line 44, change "ŋa = a–bxlogI" to -- ŋa = a–bxlogI --.

Signed and Sealed this
Fourteenth Day of April, 2015

Michelle K. Lee
*Director of the United States Patent and Trademark Office*